US007069236B1

(12) United States Patent
Tsunenari (10) Patent No.: US 7,069,236 B1
(45) Date of Patent: Jun. 27, 2006

(54) SYSTEM AND METHODS TO EFFECT RETURN OF A CONSUMER PRODUCT

(75) Inventor: Tomoo Tsunenari, Lake Success, NY (US)

(73) Assignee: Canon USA, Inc., Lake Success, NY (US)

( * ) Notice: Subject to any disclaimer, the term of this patent is extended or adjusted under 35 U.S.C. 154(b) by 153 days.

(21) Appl. No.: 09/612,945

(22) Filed: Jul. 10, 2000

(51) Int. Cl.
*G06Q 30/00* (2006.01)
(52) U.S. Cl. .......................................... 705/26; 705/27
(58) Field of Classification Search ............ 705/26–27, 705/13, 28
See application file for complete search history.

(56) References Cited

U.S. PATENT DOCUMENTS

| | | | | |
|---|---|---|---|---|
| 5,315,508 A | * | 5/1994 | Bain et al. | 705/28 |
| 5,424,944 A | | 6/1995 | Kelly et al. | 364/401 |
| 5,592,560 A | | 1/1997 | Deaton et al. | |
| 5,712,789 A | | 1/1998 | Radican | |
| 5,765,143 A | | 6/1998 | Sheldon et al. | |
| 5,960,402 A | | 9/1999 | Embutsu et al. | |
| 5,965,858 A | * | 10/1999 | Suzuki et al. | 235/375 |
| 6,028,674 A | | 2/2000 | Tognazzini | |
| 6,085,172 A | * | 7/2000 | Junger | 705/28 |
| 6,167,378 A | * | 12/2000 | Webber, Jr. | 705/8 |
| 6,264,104 B1 | | 7/2001 | Jenkins et al. | |
| 6,321,983 B1 | * | 11/2001 | Katayanagi et al. | 235/380 |
| 2002/0032573 A1 | * | 3/2002 | Williams et al. | 705/1 |

FOREIGN PATENT DOCUMENTS

WO    WO 95/26004    9/1995

OTHER PUBLICATIONS

PR Newswire, "A-Way With Waste! Recycling Cartridges Yields Free Computer Equipment For Classrooms," Feb. 2, 1999, Dialog file 20 #04198633.*
Gralla, How The Internet Works, Millennium Edition, Copyright 1999, pp. 292-293.*
USPS: Electronic Commerce News, "Web Merchants Must Make Returns Pain-free for Purchasers," Nov. 8, 1999, v4n45, Dialog file 636 #04480425.*
USPS: Catalog Age, "USPS Eases 'E-turns,'" v16n13p. 6, Dec. 1999, Dialog file 148 #11642338.*
USPS: Online Reporter, "USPS Makes Returns @ Ease," Nov. 8, 1999, Dialog file 9 #2626986.*

(Continued)

*Primary Examiner*—Robert M. Pond
(74) *Attorney, Agent, or Firm*—Fitzpatrick, Cella, Harper & Scinto (57) ABSTRACT

A system and method are disclosed that utilize computers and a network to effect the return of consumer products. In one preferred embodiment, the invention is directed to a system and method for facilitating the return of spent, recyclable products from a consumer to a destination preselected by the manufacturer for recycling. The system uses a computer, located on a network, and adapted to: (a) receive from another computer located on the network consumer information which includes an identification of the consumer product to be returned; and (b) transmit to the other computer shipping label data which includes an identification of a destination for the consumer product, selected in accordance with the consumer information, and an identification of a carrier service.

27 Claims, 6 Drawing Sheets

OTHER PUBLICATIONS

USPS: Figura, Susannah Zak; "Feeling the Byte," Government Executive, Feb. 2000, v32n2pp. 24-31, Dialog file 15 #01982972.*

UU: SmartShip: Business Wire, "SmartShip.com Gains Approval From United States Postal Service to Provide E-tailers with Merchandise Return Service," Apr. 12, 2000, Dialog file 20 #10541350.*

VV: SmartShip: Gair, Cristina; Home Office Computing, "Who Needs FedEx, Anyway?" May 2000, v18n5p. 20, Dialog file 47 #05796756.*

WW: PR Newswire, "Canon Introduces Networked and Networkable Laser Plain Paper Multifunction Systems to Boost Office Productivity," Aug. 24, 1998, Proquest #33321503.*

XX: Martin, Cathy; "Printer Supplier: Laser Status Report," Office World News, Jun. 1999, v26n6p. 16, Proqeust #43400022.*

UUU: Caldwell, Bruce; "Reverse Logistics," Information Week, Apr. 12, 1999, n729p. 48, Proquest #40496671.*

VVV: Lidsky, David; "Small Business Savings," PC Magazine, Jun. 8, 1999, Dialog file 47 #05364272.*

WorldSpy: Jindel, Satish; "Delivery E-commerce," Air Cargo World, Mar. 1999, v89n3p. 24, 6pgs, Proquest #45460492.*

WorldSpy: Internet Archive Wayback Machine; www.archive.org; worldspy.com; Oct. 8, 1999, 6pgs.*

"USF Logistics Acquires Reverse Logistics Provider, Processors Unlimited," World Reporter, Mar. 2, 1999 (Business Wire).

"ValueAmerica.com Dramatically Increases Customer Service Capabilities with FedEx NetReturn," World Reporter, Jul. 8, 1999 (Business Wire).

"Many Happy Returns (Reverse logistics, the handling and disposition of returned products and opportunity to gain a competitive advantage)," Journal of Business Strategy, v. 20, No. 4, pp. 27-31, Jul. 1999.

Return Central Product Brochure and Press Release.

* cited by examiner

Welcome To The Acme
Product Return Program

Are you a first-time User?

31 — ◯ yes

Please enter the information requested below:

Name :
Company :
Address :
eMail :
Telephone :
Facsimile :

41 — ◯ Submit

Please enter your User ID and Password.

User ID: [          ]

Password: [          ]

71 — ◯ Submit

Enter the type of Product you want to return

[                              ]

81 — ◯ Submit

SYSTEM AND METHODS TO EFFECT RETURN OF A CONSUMER PRODUCT

BACKGROUND OF THE INVENTION

1. Field of the Invention

The present invention is directed to a system and method that utilize computers and a network to effect the return of consumer products. In one preferred embodiment, the invention is directed to a system and method for facilitating the return of spent, recyclable products from a consumer to a destination preselected by the manufacturer for recycling.

2. Description of the Related Art

There are many circumstances in which it is desirable to move a product from a consumer back to a manufacturer, for a variety of reasons. In the field of laser toner cartridges, for example, it is desirable to move a spent cartridge from the consumer back to the manufacturer, so that the manufacturer may recycle the cartridge. Such a system allows the manufacturer to re-use some portions of the cartridge in order to fabricate new cartridges, and to reduce other portions to scrap materials which may also be re-used. Recycling a cartridge in this manner allows a manufacturer to fabricate new cartridges more cheaply, and also has very positive effects on the environment.

U.S. Pat. No. 5,965,858 to Suzuki, et al. proposes a manufacturer article recycling program. In that patent, articles are manufactured at a manufacturing factory, delivered to stores, and purchased at stores by customers. After the customer has used the article for a given period of time, it is brought to a local deposit place (or to the store, which then sends it to the deposit place), where it is classified on the basis of category or class, and then sent to an appropriate recycling facility. In Suzuki et al., however, there is nothing which addresses the particulars of how the article is moved from the customer to the deposit place.

One conventional method of effecting the delivery of consumer product for recycle is to include with a newly purchased product a pre-authorized shipping label.

Such a label is typically pre-printed with a pre-selected destination (such as the manufacturer's recycling facility), and is pre-authorized by a specific carrier (such as, for example, United Parcel Service). When a consumer has exhausted the product and is ready to return it, the consumer locates the label that came with the product, locates a box in which to put the product, affixes the label and ships the product in the box with the label affixed.

The above-described method is a generally good one, and has been used to effect extremely successful recycling programs. Nonetheless, it suffers from several significant drawbacks, most of which stem from the fact that it basically a static, non-adaptable system which cannot be easily modified as circumstances change. For example, if the label included in the original packaging is lost, the consumer cannot readily effect the return of the product.

Another drawback associated with the conventional method is that the manufacturer must select the destination of the consumer product return when the product is initially packaged, and cannot change the destination thereafter. And because the selection must be made at the time the product is packed, before the manufacturer knows in whose hand the product will ultimately wind up, it cannot be tailored to a specific consumer. Thus, the manufacturer cannot direct the consumer product to be returned to a destination closer to the consumer, thereby lowering shipping costs.

Another drawback of the conventional method for handling product returns is that the method offers no mode for interaction with the consumer during the return process. In fact, a product manufacturer typically cannot tell where a returned package originated from, or whether the returned package contains the product at all. Indeed, unscrupulous individuals have been known to abuse the product return system by affixing a pre-authorized label to a non-authorized item, sometimes delivering an unwanted and bulky item to the product manufacturer's return destination.

Moreover, packing a pre-authorized shipping label with a consumer product locks in the manufacturer to the carrier service indicated on the shipping label. This reduces the ability of the manufacturer to negotiate among potential carrier services to obtain the lowest cost.

There is a need, therefore, for a system and method of effecting the return of a consumer product that takes an entirely fresh approach, and overcomes the drawbacks associated with the conventional methods discussed above.

SUMMARY OF THE INVENTION

It is an object of the invention to provide a system and method for effecting consumer product returns which overcome the drawbacks and disadvantages associated with the prior art methods.

In a first embodiment, the invention is embodied as a computer, located on a network, for effecting the return of a consumer product, the computer being adapted to: (a) receive from another computer located on the network consumer information which includes an identification of the consumer product to be returned; and (b) transmit to the other computer shipping label data which includes an identification of a destination for the consumer product, selected in accordance with the consumer information, and an identification of a carrier service.

In particularly preferred embodiments, the above-described computer adapted to perform functions (a) and (b) is the manufacturer's server computer, the other computer is a client computer operable by a consumer, and the network linking the two computers is the Internet.

The computer may be advantageously used to effect the return of recyclable materials, such as for example spent laser printer toner cartridges.

In some embodiments of the present invention, a manufacturer's computer performs a method comprising the steps of (a) receiving consumer information from a first computer over a network, wherein said consumer information includes product type information; (b) storing the consumer information in a database server; (c) selecting a destination for said consumer product and a carrier in accordance with the consumer information; and (d) transmitting shipping label data including said destination and carrier service to a client computer.

In some embodiments, the method includes a step of comparing consumer information entered at the manufacturer's server computer with consumer information stored in one or more databases.

The invention is also embodied as a first computer operable by a consumer and operatively connected to a printer. The first computer is located on a network linking it to a second computer. The first computer is adapted to: (a) transmit to the second computer consumer information including at least product type information; (b) receive from the second computer shipping label data including an identification of a destination for the consumer product, selected in accordance with the consumer information, and an identification of a carrier service; and (c) transmit shipping label data to the printer to cause a shipping label to be printed.

The invention may also be embodied as a system for effecting the return of a consumer product, which includes (a) a first computer; (b) a network linking the first computer to a second computer, the second computer adapted to receive consumer information from the first computer over the network and to transmit shipping label data to the first computer; (c) a printer operatively connected to the first computer and adapted to print a shipping label; and (d) a carrier service adapted to deliver the consumer product to a destination indicated in said shipping label.

The invention is also embodied as computer code, running on a computer located on a network, for effecting the return of a consumer product, including: (a) code for receiving from another computer located on the network consumer information which includes an identification of the consumer product to be returned; (b) code for processing the consumer information and generating shipping label data; and (c) code for transmitting to the other computer shipping label data which includes an identification of a destination for the consumer product, selected in accordance with the consumer information, and an identification of a carrier service.

BRIEF DESCRIPTION OF THE DRAWINGS

The foregoing and other objects, aspects and advantages of the present invention will be better understood from the following detailed description of preferred embodiments of the invention with reference of the drawings, wherein.

DETAILED DESCRIPTION OF THE PREFERRED EMBODIMENTS

"Consumer" means generally any person or entity who desires to return a consumer product. In preferred embodiments, the consumer is an individual or entity actually buying and using the consumer product to be returned, and about whom a consumer profile can be maintained. However, in the broadest embodiment, a consumer is simply an entity effecting the consumer product return.

"Manufacturer" means the person or entity organizing and authorizing the consumer product return. In preferred embodiments, the entity organizing and authorizing the consumer product return is, in fact, the entity which actually manufactured the product, and uses the system of the present invention to track product usage information and consumer information, as will be discussed in greater detail below. Nevertheless, this is not required of the system and method as broadly disclosed herein.

"Consumer product" or sometimes simply "product" means any product under the sun. In one preferred embodiment, the consumer product to be returned is recyclable product, such as for example a recyclable laser printer toner cartridge. However, the system and methods for effecting product returns according to the invention can be adapted to the return of any consumer product.

"Computer" may refer to a single computer or to a system of interacting computers. Generally speaking, a computer is a combination of a hardware system, a software operating system and perhaps one or more software application programs. Examples of computers include, without limitation, IBM-type personal computers (PCs) having an operating system such as DOS, Windows, OX/2 or Linux; Macintosh computers; hardware having a JAVA-OS operating system; graphical work stations, such as Sun Microsystems and Silicon Graphics Workstations having a UNIX operating system; PalmPilots; and PilotPCs.

"Network" means a connection between any two or more computers, which permits the transmission of data. An example of a network is the Internet.

"User identification information" is consumer information that uniquely describes a consumer and includes, without limitation, user ID and password information.

"Web page" means any documents written in mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web site" means at least one Web page, and preferably a plurality of Web pages, virtually connected to form a coherent group.

"Web browser" means any software program which can display text, graphics, or both, from Web pages on Web sites. Examples of Web browsers include, without limitation, Netscape Navigator and Microsoft Internet Explorer.

"Web server" refers to a computer or other electronic device which is capable of serving at least one Web page to a Web browser.

The phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

For the present invention, a software application could be written in substantially any suitable programming language, which could easily be selected by one of ordinary skill in the art. The programming language chosen should be compatible with the computer by which the software application is executed, and in particular with the operating system of that computer. Examples of suitable programming languages include, but are not limited to, C, C++, CGI, Java and Java Scripts. Furthermore, the functions of the present invention, when described as a series of steps for a method, could be implemented as a series of software instructions for being operated by a data processor, such that the present invention could be implemented as software, firmware or hardware, or a combination thereof.

Figure 1:
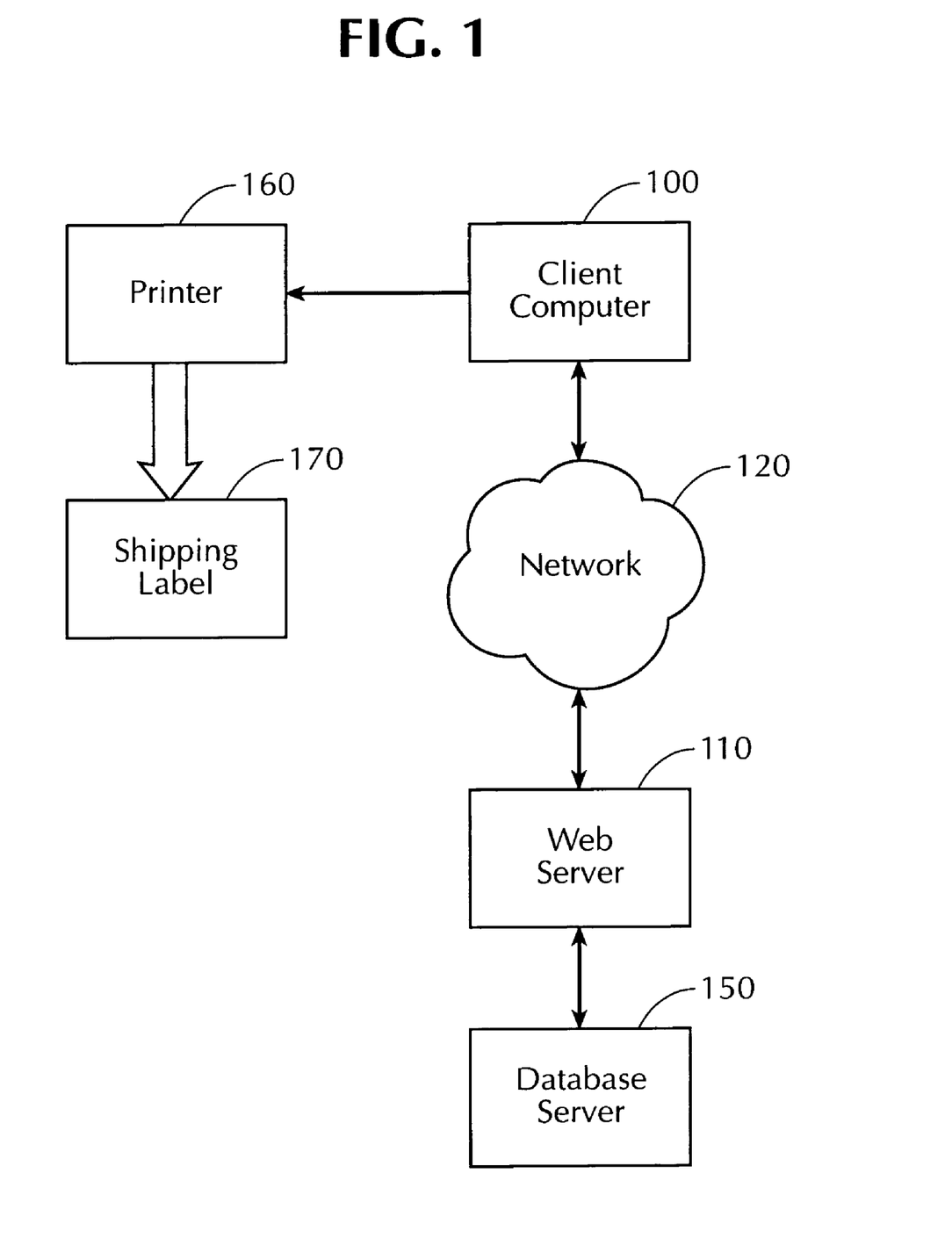
FIG. 1 is a block diagram depicting elements of a system embodied according to the invention.

An example of the system of the present invention is depicted schematically in FIG. 1. As shown, the system includes Web server 110 (such as a manufacturer's Web server) operably connected to a database server 150 and a network 120. The network 120 may be, for example, the Internet. Also connected to the network 120 is a client computer 100 (such as a consumer's client computer), which in turn is connected to a printer (preferably a laser printer) 160 that can print a shipping label 170, in a manner that will be discussed in greater detail below.

Preferably, the database server 150 comprises a relational database management system, in which stored information is arranged in tables of rows and columns, related to one another by predetermined functions, and can be accessed by database query protocols, such as the Structural Query Language (SQL).

It will be readily appreciated that the schematic of FIG. 1 is exemplary only, and that numerous variations are plainly possible. For example, each of the computers 100 and 110 may be connected to their own network, which networks in turn are connected to network 120. The system may also be implemented with multiple client computers and multiple Web servers. Other variations exist as well.

Client computer 100 preferably includes communications hardware and an operating system with graphical user interface (GUI) functionality to allow for interface with the Internet, and is preferably equipped with graphical World Wide Web (Web) browser software, such as Netscape Navigator or Microsoft Internet Explorer, loaded thereon and operable to read and send Hypertext Markup Language (HTML) forms from and to a Hypertext Transport Protocol (HTTP) server on the Web. Preferably, client computer 100 is operable to act as a virtual machine to run Java applets, or the like, downloaded by the browser from the server. Specifically, the client computer 100 has to be capable of delivering consumer information to the manufacturer's server computer, as will be discussed below. The Web server 110 preferably includes hardware, HTTP compliant software, an operating system and common gateway interface (CGI) software for interfacing with input queries and sources of data. The Web server 110 receives consumer information and stores the consumer information in database server 150.

Figure 2:
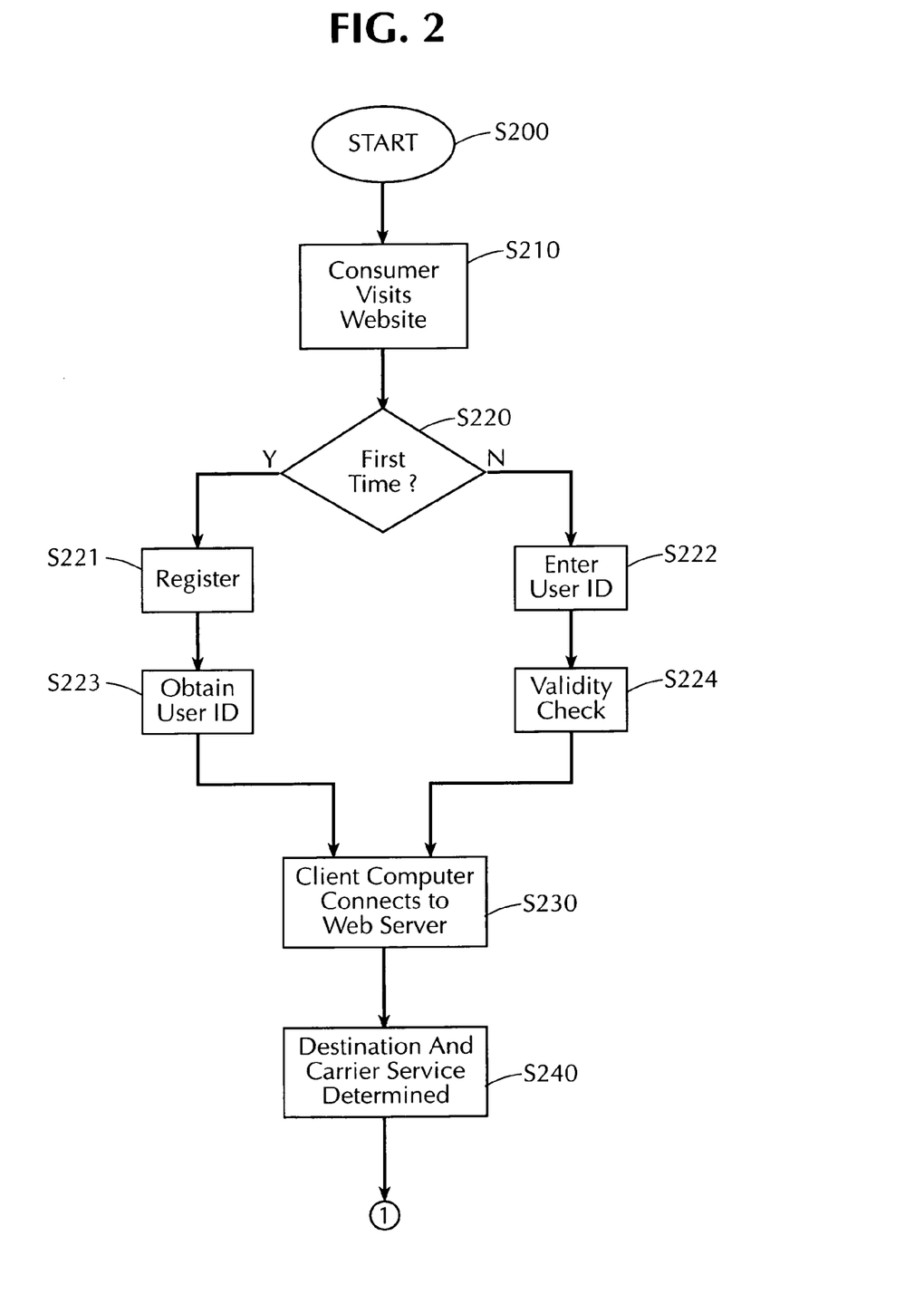
FIG. 2 is a flow chart depicting operation of the system according to preferred embodiments of the invention.

Turning to the operation of the invention according to a preferred embodiment, reference is made to FIG. 2. Step S200 is a start step. As shown in FIG. 2, a consumer who has decided to return a product initially connects to the Web server 110 (step S210), to retrieve and display a Web page, such as for example by inputting the URL of such a Web page into the Web browser of the client computer 100. This action, routine in today's economy, is commonly referred to as "visiting the Webt site" of the manufacturer. The URL may have been provided to the consumer in or on the original packaging of the goods, along with instructions to retrieve the Web page when it is desired to return the product.

Figure 3:
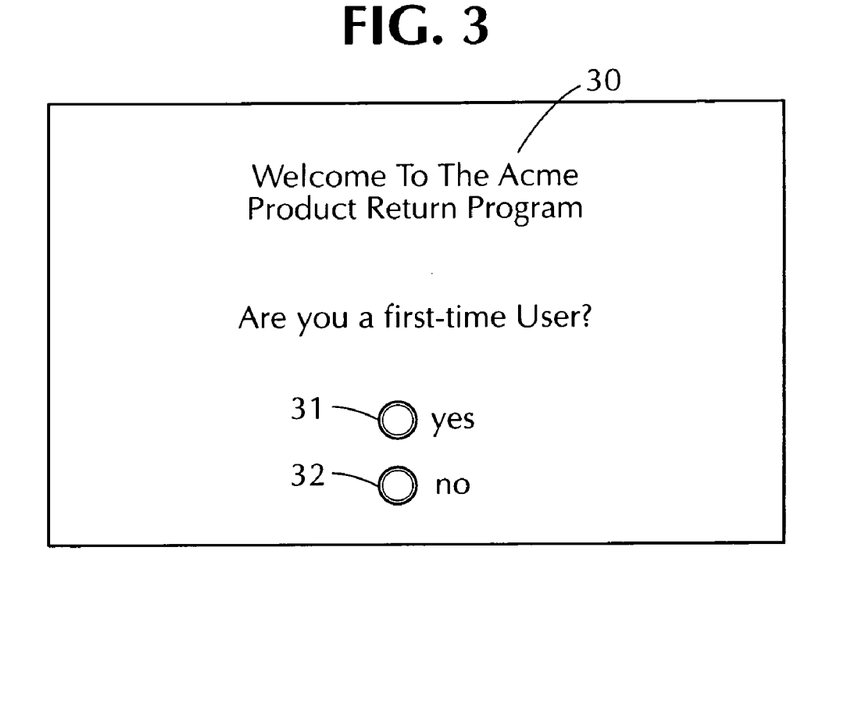
FIGS. 3, 4, 5, 6, 7 and 8 are exemplary Web pages served by a Web server during operation of the system according to an embodiment of the invention.
Figure 4:
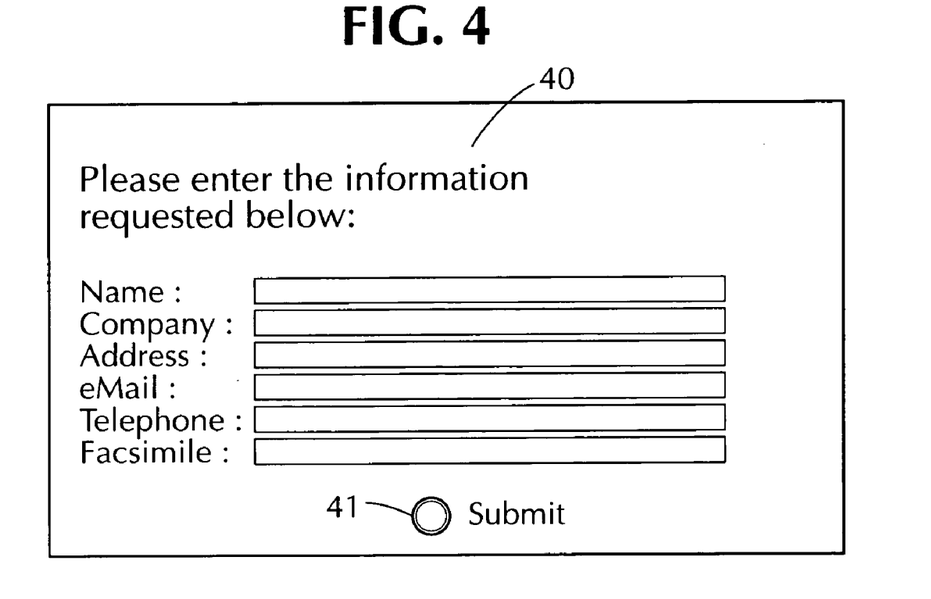

An exemplary Web page 30 that Web server 110 might serve to client computer 100 upon initial connection is illustrated in FIG. 3. As is shown, this Web page asks whether the customer is a first-time user of the program or has used the program before (Step S220). Two buttons 31 and 32 are provided for customer response. If the consumer is a first time user, the Web server will serve a Web page which allows the consumer to register with the program, such as the exemplary Web page 40 illustrated in FIG. 4. This Web page is a CGI form that includes fields which allow (or require) the consumer to input various data, and a submit button 41 to transmit that information to the Web server. Once the information is received, it is stored in the database server 150. The specific fields illustrated in FIG. 4 are, of course, only exemplary and other fields may be used in addition or in lieu of all or some of them.

The consumer's name and address may be advantageously used to direct the consumer product to the facility closest to the consumer. For example, a particular manufacturer administering a recycling program may elect to establish two recycling facilities, one on the East coast and one on the West coast of the United States. The manufacturer may require the location of the consumer, so that it may direct the product to the one of the two facilities that is closest to the consumer.

Figure 5:
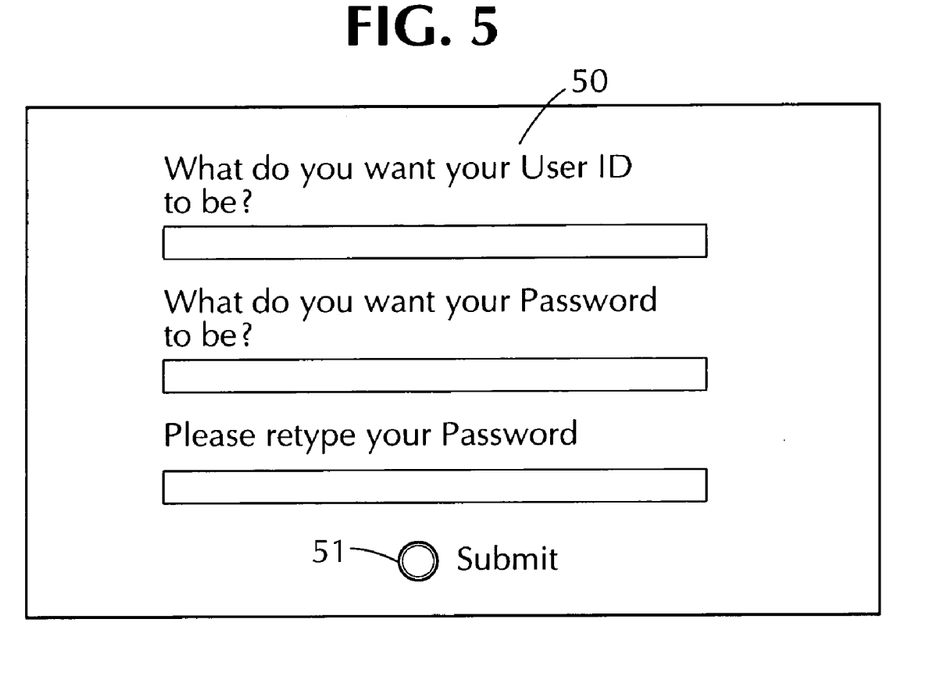
Figure 6:
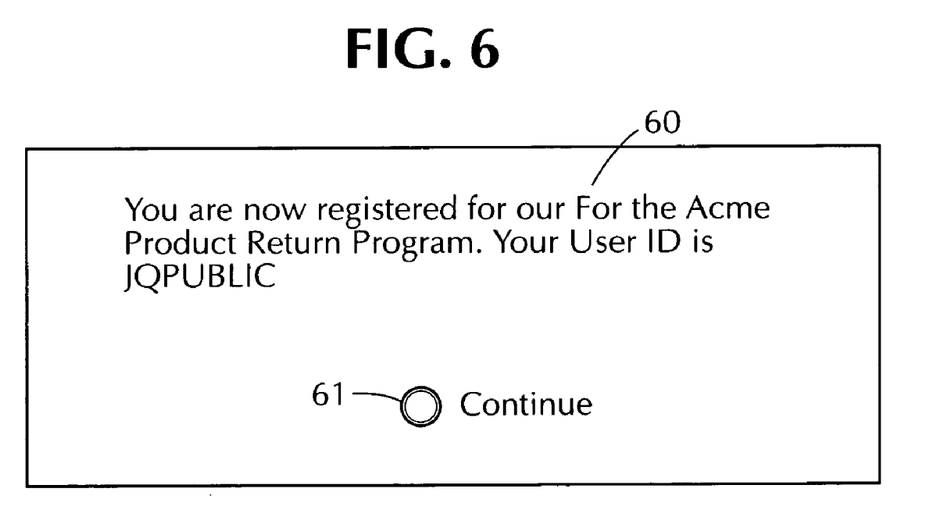

Upon submitting the form of Web page 40, the Web server serves a Web page, such as the Web page 50 of FIG. 5, that allows the consumer to specify a user identification ("user ID") and password (by entering that information and clicking the submit button 51). Once those data are received by the Web server, the Web server stores them in the database server 150, and serves the client computer 100 a Web page confirming the user ID that the consumer specified (step S222), as illustrated in FIG. 6.

Once the user ID has been established by the Web server, the consumer does not have to undertake registration steps S221 and S223 to effect a product return. Rather, on second and subsequent visits, the Web server serves a Web page that provides a form for inputting the already established user ID and password (step S222), such as Web page 70 illustrated in FIG. 7. The consumer enters the information, and clicks the submit button 71.

Figure 7:
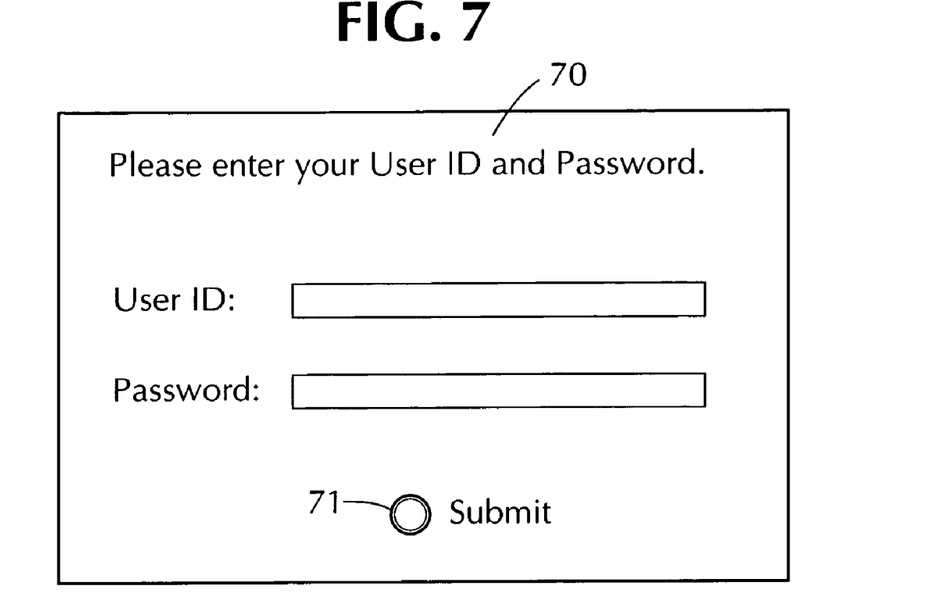

In an alternate embodiment, the user ID and password information is not entered manually by the consumer, but is rather provided automatically via a cookie file placed on the client computer 100 by the Web server during the initial registration process.

In any event, upon receipt by the Web server of the user ID and password information, the Web server performs a validity check (Step S224) to determine whether the user ID is valid. More particularly, the Web server compares the information received from the client computer with consumer information stored in database server 150. Thus, if a given user ID does not exist, or does not correspond with given consumer name information, for example, the consumer may be re-served the Web page 70 to re-enter user identification.

Figure 8:
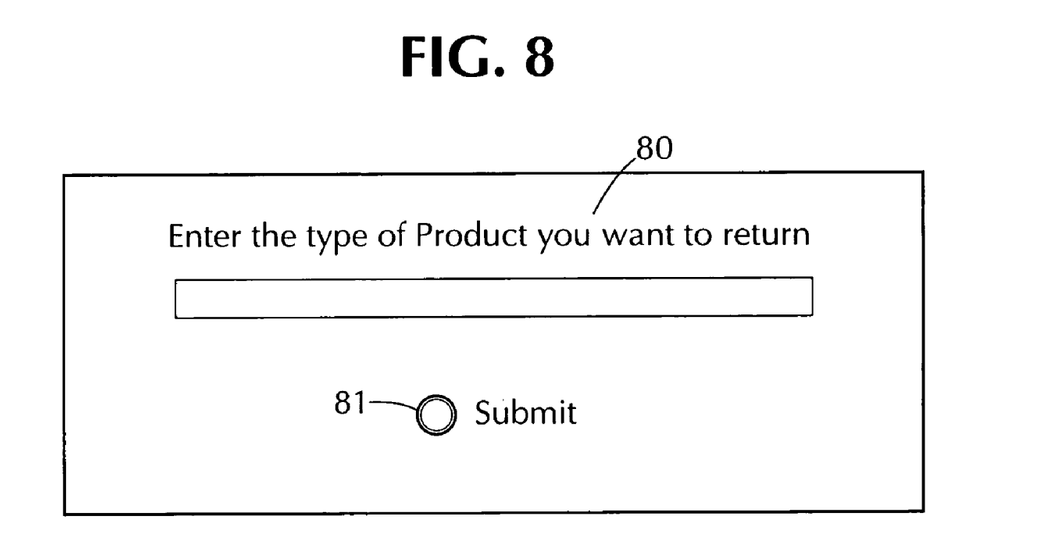

Following a successful validity check (or following a first-time user clicking the continue button 61 of Web page 60), the client computer 100 is served in step S230 with a Web page 80 shown in FIG. 8, which provides a form for inputting data indicating information about the product to be returned. Such information typically would include information indicating what type of product is to be returned) and may be a model type or a textual description of the product. This information may be entered by the user via a keyboard or the like, or alternatively may be entered by the user selecting a product from a list of available products, provided in the form of a pull-down menu or the like. The entered product type information is subjected to the same type of validity check as is performed in connection with the validation of user identification information in step S224, i.e. the entered product is compared with a list of products maintained in database server 150, to determine if it is a valid product. If it is not a valid product, a suitable message is returned to the client computer 100.

If the product type is valid, a destination is determined and shipping label data is transmitted, as will be set forth below. In a preferred embodiment of the present invention, the product identification information includes not only information indicating the generic type of the product (e.g. "laser toner cartridge"), but also an indication of the serial number of the specific product. In such a case, the serial number, too, is subjected to a validity check, by comparing it to serial numbers on a list of serial numbers maintained in the database server 150. In a preferred embodiment of the present invention, the Web server 110, after receiving product information from the client computer 100, will serve a Web page that provides a form for inputting information about the consumer's use of the product. Such use information might include such things as, for example, whether the consumer is using the product in a home or office setting; how much the consumer is using the product; how much the consumer paid for the product; where the consumer purchased or learned of the product; and myriad other data of interest to the manufacturer. This information, once received by the Web server, is stored in the database server 150. Such information allows the database server to maintain rich information not only with respect to a particular customer, but also with respect to the particular products that are returned.

In another preferred embodiment of the present invention, the consumer product is provided with a smart chip which collects information about the product during use. If the product is a printer cartridge, the information can include the number of prints made, the type of printer the cartridge is used in, or any other information about the product that a smart chip can be programmed to record. This information, once retrieved from the returned product, can be added to the database server 150. Product information gleaned from a smart chip may be associated in the database server 150 with a particular consumer through a product serial number, for example. In this manner, the manufacturer can even more precisely monitor the life cycle of the product.

Figure 2A:
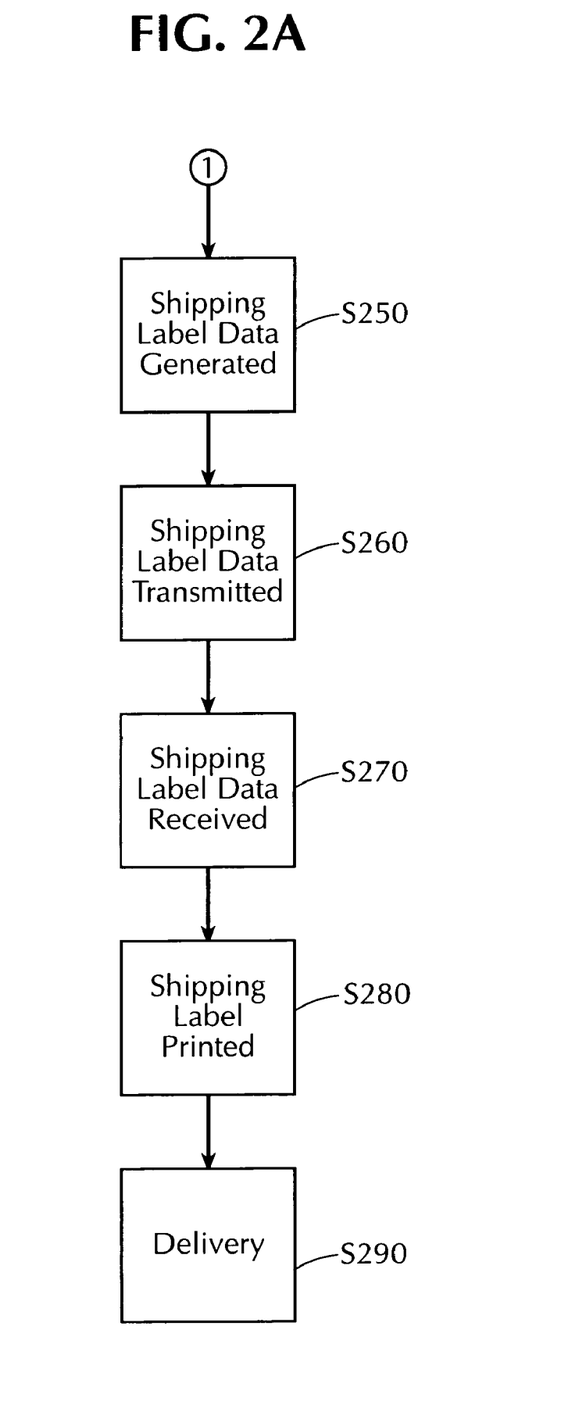
FIG. 2A is a continuation of the flow chart of FIG. 2 from point ①.

Once product information has been entered and received by the Web server, the Web server selects a product return destination for the consumer product, and a carrier service that will handle the transport (step S240). Generally, the Web server 110 will determine the destination of the product in accordance with the product type sending the product to a facility at which it may be processed. For example, in the case of a laser toner cartridge being returned for recycling, a destination will be chosen at which the recycling can be done. The destination may be further refined in accordance with the location of the consumer, selecting whatever suitable destination is closest to the consumer in order to minimize shipping costs. The database server maintains a list of all available destinations, their locations and their processing capabilities, and is accessed by the Web server 110 in determining the destination for a particular product.

Also maintained in the database server 150 is a list of all carrier services, and their charges for specified transports. The Web server 110 accesses this information as well, to determine which carrier service is the most economical, given the nature of the product to be returned (such as its weight and dimensions) and the pick-up and delivery points. Preferably, the carrier server 150 is updated periodically, to reflect changes in rates, newly negotiated contracts, etc.

Once a destination and a carrier service are selected, the Web server generates shipping label data (step S250). The shipping label data include data sufficient for the client computer 100 to direct a printer 160 to print a shipping label that includes an identification of the destination and of the carrier service selected. The shipping label data also include data necessary to print an actualization code on the label, indicating that the shipping of the package on which the label is affixed has been pre-authorized and that the receiver (i.e. the manufacturer) will pay the shipping costs. The shipping label data also preferably, includes data necessary to print the sender's address. Such an enhancement provides a significant deterrent to abuse of the system.

The shipping label data is transmitted from the Web server 150 (step S260) and received by the client computer 100 (step S270) with the client computer operably connected to a printer 160 adapted to print shipping labels (step S280). In a preferred embodiment, the shipping label data is transmitted and received in a format such that the consumer can cause labels to be printed without installing additional software on the client computer. In any event, the product to be returned is placed into appropriate packaging by the consumer, and the printed label is affixed thereto.

The delivery step (S290), is effected by a carrier service, such as for example United Parcel Service, Federal Express or the like. Typically, the carrier service will pick up a package from the consumer, and deliver the package to the destination printed on the shipping label.

In practice, the carrier service typically contracts with the manufacturer to permit the transmission of the shipping label data, because it is the carrier service who will accept the authorization on the shipping label. Thus the carrier service itself is generally adapted to receive and transmit authorization information over a network.

In another independent embodiment, the client computer is located at a receiving site, rather than at the consumers' home or facility. A receiving site can be a location where disparate consumers drop off products to be returned. In this embodiment, a receiving site obtains a user ID and password in the same manner as the consumer obtained this information in the preceding embodiments. However, as part of the consumer information transmitted from the client computer to the manufacturer's Web server, an additional piece of consumer information is required: "number of boxes requested."

An appropriate product destination is selected based upon product type and consumer information as in the preceding embodiments. However, instead of transmitting shipping label data to the client computer as in the preceding embodiments, empty boxes to which shipping labels can be affixed are mailed to the receiving site. Transmitting and receiving of shipping label data and printing of shipping labels proceeds as in the above-described embodiments. Several products are loaded into the boxes and the boxes are delivered to the selected destination by the carrier service.

The foregoing detailed description is intended to be illustrative and not limiting of the invention, which is defined by the appended claims. For example, although much of the above description is with respect to a recycling program, the systems and methods of the present invention may be used to effect product return for any reason, such as product service, product repair, customer dissatisfaction, etc. Various other modifications are possible as well.

I claim:

1. A computer, located on a network, for effecting the return of a consumer product for recycling, the computer comprising:
   (a) hardware operating under the control of software that receives from another computer located on the network consumer information which includes an identification of a consumer product to be returned for recycling and a present location of the consumer product;
   (b) hardware operating under the control of software that automatically determines a destination for the consumer product, based upon the received identity of the consumer product and the received present location of the consumer product;
   (c) hardware operating under the control of software that automatically determines a carrier service that will deliver the consumer product to the destination based upon the received present location of the consumer product and the location of the automatically determined destination; and
   (d) hardware operating under the control of software that transmits to the other computer shipping label data which includes an identification of the automatically determined destination and an identification of the automatically determined carrier service.

2. The computer of claim 1, further comprising the hardware operating under the control of software that stores consumer information received from the other computer in a database server.

3. The computer of claim 2, wherein the consumer information includes product serial number data.

4. The computer of claim 2, wherein the consumer information includes consumer name and address information.

5. The computer of claim 4, the computer transmitting user identification information to the other computer.

6. The computer of claim 1 wherein said computer is a Web server, the other computer is a client computer, and said network is the Internet.

7. The computer of claim 1, wherein the consumer product is recyclable and the destination is a recycling facility.

8. The computer of claim 7, wherein the consumer product is a laser printer toner cartridge, and wherein the other computer is operatively connected to a laser printer.

9. The computer of claim 1, the computer receiving, as components of the consumer information, information concerning use of the consumer product.

10. A method of effecting consumer product returns for recycling over a network comprising:
 (a) receiving consumer information from a first computer over a network, said consumer information including product type information and present location information for the consumer product being returned for recycling;
 (b) storing the consumer information in a database server;
 (c) automatically determining a destination for the consumer product based upon the received product type information and the received present location of the consumer product;
 (d) automatically determining a carrier service that will deliver the consumer product to the destination based upon the received present location of the consumer product and the location of the automatically determined destination;
 (e) transmitting to said first computer shipping label data including an identification of the automatically determined destination and an identification of the automatically determined carrier service.

11. The method of claim 10, wherein said consumer information includes consumer name and address information.

12. The method of claim 10, further comprising a step of transmitting user identification information to said first computer.

13. The method of claim 10, wherein said shipping label data transmitted to said first computer is processed by said first computer to print a shipping label at a printer operatively connected to said first computer.

14. The method of claim 10 further comprising a step of transmitting to the other computer a cookie file containing user identification information.

15. A first computer operatively connected to a printer, said first computer located on a network linking said first computer with a second computer, the first computer comprising:
 (a) hardware operating under the control of software that transmits to a second computer consumer information including at least product type information and present location information for a consumer product to be returned for recycling;
 (b) hardware operating under the control of software that receives from the second computer shipping label data including an identification of an automatically determined destination for the consumer product and an identification of an automatically determined carrier service that will deliver the consumer product to the destination, the destination having been automatically determined by the second computer based upon the received product type information and the received present location of the consumer product, and the carrier service having been automatically determined by the second computer based upon the received present location of the consumer product and the location of the automatically determined destination; and
 (c) hardware operating under the control of software that transmits the shipping label data to the printer to enable the printer to print a shipping label.

16. A system for effecting return of a consumer product for recycling, comprising:
 (a) a first computer;
 (b) a second computer;
 (c) a network linking the first computer to the second computer, the second computer receiving consumer information from said first computer over the network and to transmit shipping label data to said first computer, said consumer information including an identification of a consumer product to be returned for recycling and a present location of the consumer product, said shipping label data including an automatically determined destination for the consumer product and an identification of an automatically determined carrier service that will deliver the consumer product to the destination, the destination having been automatically determined by the second computer based upon the received identity of the consumer product and the received present location of the consumer product, and the carrier service having been automatically determined by the second computer based upon the received present location of the consumer product and the location of the automatically determined destination; and
 (d) a printer operatively connected to said first computer that prints a shipping label from the shipping label data.

17. The system of claim 16, further comprising a consumer information database server that stores consumer information.

18. The system of claim 16, wherein consumer information includes a product serial number.

19. The system of claim 16, wherein said consumer product is a printer cartridge and said printer is adapted to utilize said printer cartridge.

20. The system of claim 16, wherein said printer cartridge is a recyclable laser printer toner cartridge.

21. The system of claim 20, wherein said printer cartridge includes a chip adapted to collect product information.

22. The system of claim 16, wherein the delivery address included in the shipping label data is selected from a finite list by the second computer based on the consumer information.

23. A computer program product stored on a computer readable medium and executable on a computer located on a network, for effecting the return of a consumer product for recycling, including:
 (a) code for receiving from another computer located on the network consumer information which includes an identification of the consumer product to be returned for recycling and a present location of the consumer product;

(b) code for automatically determining a destination for the consumer product based upon the received identity of the consumer product and the received present location of the consumer product;

(c) code for automatically determining a carrier service that will deliver the consumer product to the destination based upon the received present location of the consumer product and the location of the automatically determined destination;

(d) code for generating shipping label data which includes an identification of the automatically determined destination and an identification of the automatically determined carrier service; and (e) code for transmitting the shipping label data to the other computer.

24. The computer program product of claim 23, further including code for storing consumer information received from the other computer in a database server.

25. The computer program product of claim 24, wherein the consumer information includes product serial number data.

26. The computer program product of claim 23, wherein code for processing includes code for generating shipping label data using consumer name and address information as inputs.

27. The computer program product of claim 23, wherein code for transmitting includes code for transmitting user identification and password information to the other computer.

* * * * *

UNITED STATES PATENT AND TRADEMARK OFFICE
CERTIFICATE OF CORRECTION

PATENT NO. : 7,069,236 B1  Page 1 of 1
APPLICATION NO. : 09/612945
DATED : June 27, 2006
INVENTOR(S) : Tomoo Tsunenari It is certified that error appears in the above-identified patent and that said Letters Patent is hereby corrected as shown below:

COLUMN 1:

Line 39, Close up right margin;
    Line 40, Close up left margin; and
    Line 51, "it basically" should read --it is basically--.

COLUMN 3:

Line 29, "of" should read --to--.

COLUMN 5:

Line 40, "Webt" should read --Web--.

COLUMN 7:

Line 60, "preferably," should read --preferably--.

COLUMN 9:

Line 14, "claim 1" should read --claim 1,--; and
    Line 41, "destination;" should read --destination; and--.

Signed and Sealed this

Fifteenth Day of April, 2008

JON W. DUDAS
*Director of the United States Patent and Trademark Office*